(12) United States Patent
Damera-Venkata et al.

(10) Patent No.: US 8,982,184 B2
(45) Date of Patent: Mar. 17, 2015

(54) METHOD FOR COMPENSATING FOR CROSS-TALK IN 3-D DISPLAY

(75) Inventors: Niranjan Damera-Venkata, Fremont, CA (US); Nelson Liang An Chang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 554 days.

(21) Appl. No.: 13/384,944

(22) PCT Filed: Dec. 8, 2009

(86) PCT No.: PCT/US2009/067181
§ 371 (c)(1),
(2), (4) Date: Jan. 19, 2012

(87) PCT Pub. No.: WO2011/071488
PCT Pub. Date: Jun. 16, 2011

(65) Prior Publication Data
US 2012/0262544 A1 Oct. 18, 2012

(51) Int. Cl.
*H04N 13/02* (2006.01)
*H04N 13/04* (2006.01)

(52) U.S. Cl.
CPC ....... *H04N 13/0434* (2013.01); *H04N 13/0425* (2013.01)
USPC ..................................... 348/43; 348/E13.064

(58) Field of Classification Search
CPC .................... H04N 13/0055; H04N 19/00769; H04N 13/0239
USPC .......................................................... 348/43
See application file for complete search history.

(56) References Cited

U.S. PATENT DOCUMENTS

| 5,151,792 | A | * | 9/1992 | Yoshikawa et al. | ........... 386/202 |
| 8,542,326 | B2 | * | 9/2013 | MacNaughton et al. | ....... 349/15 |
| 8,587,639 | B2 | * | 11/2013 | Matthews | ........................ 348/51 |
| 8,797,340 | B2 | * | 8/2014 | Slavenburg et al. | .......... 345/545 |
| 2006/0268104 | A1 | | 11/2006 | Cowan et al. | |
| 2008/0036696 | A1 | * | 2/2008 | Slavenburg et al. | .............. 345/8 |

FOREIGN PATENT DOCUMENTS

CN 101123736 2/2008
JP 2004-333561 A 11/2004

(Continued)

OTHER PUBLICATIONS

Skala,("Cross-talk measurement for 3D dispalays," 3DTV Conference: The True Vision—Capture, Transmission and Display of 3D Video, 2009 , vol., No., pp. 1,4, May 4-6, 2009.*

(Continued)

*Primary Examiner* — Jay Patel
*Assistant Examiner* — Frank Huang
(74) *Attorney, Agent, or Firm* — Hewlett-Packard Patent Department

(57) ABSTRACT

A method for compensating for cross-talk in a 3-D projector-camera system having a controller including a processor and system memory and at least two channels, includes the steps of calibrating the projector-camera system, computing cross-talk factors applicable to the projector-camera system, and correcting new image data for cross-talk based upon the computed cross-talk factors. The system is calibrated by sequentially projecting and capturing, with a camera, a calibration image for each channel, to capture cross-talk between the channels. The controller can compute the cross-talk factors based upon the captured calibration images.

10 Claims, 5 Drawing Sheets

(56) References Cited

FOREIGN PATENT DOCUMENTS

| | | | |
|---|---|---|---|
| JP | 2009-507401 T | 11/2006 | |
| JP | 2008-072699 A | 3/2008 | |
| KR | 10-0236135 | 2/2008 | |
| KR | 20080013815 | 12/2009 | |

OTHER PUBLICATIONS

International Search Report, PCT/US2009/067181, Aug. 2, 2010, 10 pages.

XP 31114693A I—Realizing Super-Resolution with Superimposed Projection, Niranjan Damera-Venkata, Nelson L. Chang.

* cited by examiner

US 8,982,184 B2

METHOD FOR COMPENSATING FOR CROSS-TALK IN 3-D DISPLAY

BACKGROUND

As a result of recent advances in polarization-related technologies, polarization-based 3-D systems are rapidly becoming the most popular 3-D systems for motion pictures. The use of polarized 3-D projection is more common largely because it is much cheaper to provide polarized glasses to viewers. 3-D polarized projection uses dual complementary polarizing elements that either emit, transmit or reflect (via a polarization preserving screen) images comprised of polarized light, to each eye. The light to each eye is selected via corresponding complementarily polarized lenses in the viewer's glasses, to produce distinct images to each eye, giving the effect of stereoscopic vision and hence the illusion of depth in the projected image.

One significant challenge in 3-D polarized projection is crosstalk between image channels. That is, part of the image intended for one eye bleeds or leaks through to the other eye, thus diminishing the image quality. Cross-talk in 3-D polarized projection systems generally occurs due to imperfections in the polarization and selection process.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Figure 1A:
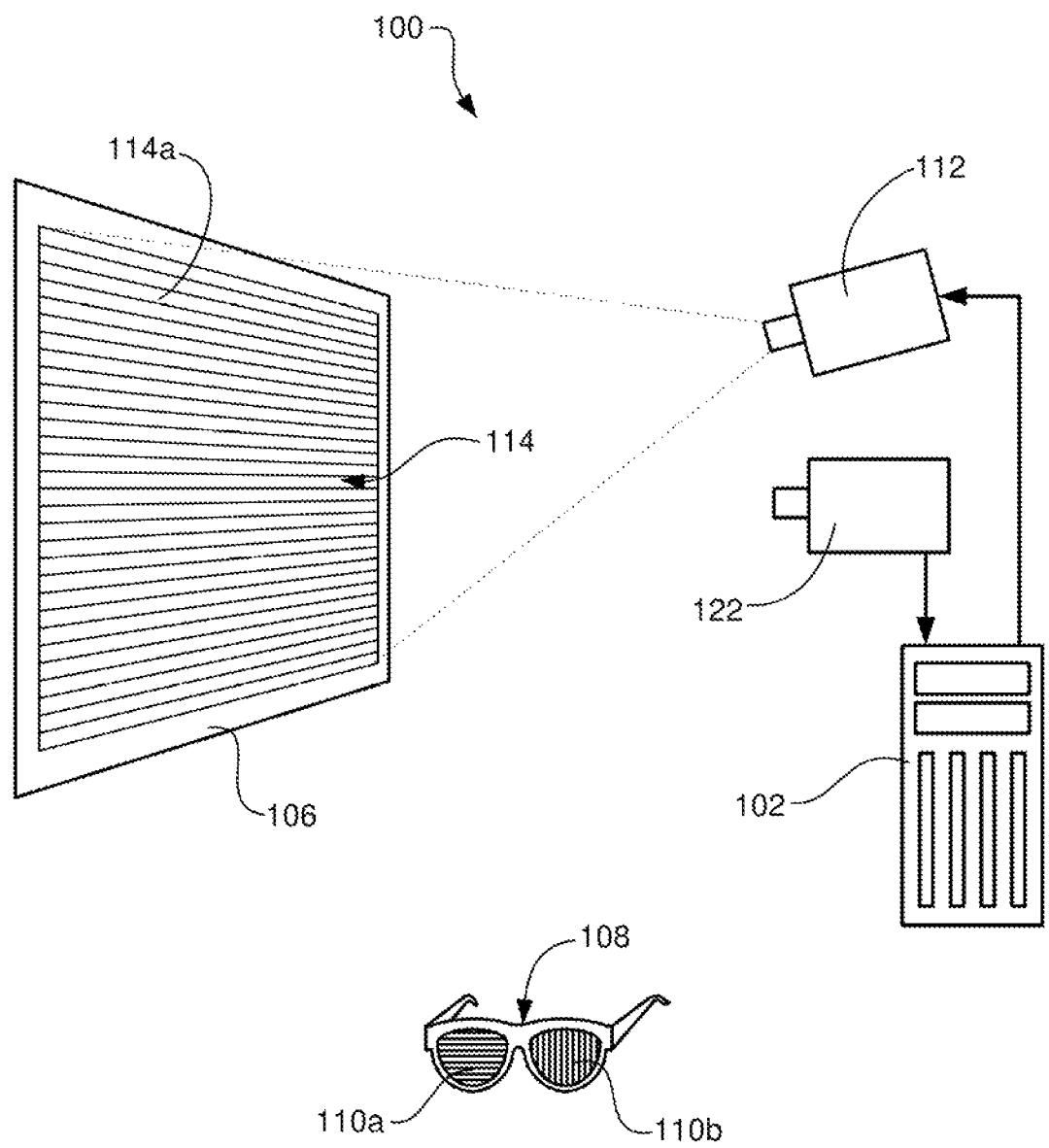
FIG. 1A is a diagram illustrating a single projector polarization-based 3-D display system projecting a horizontally polarized sub-frame.

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

As used herein, directional terms, such as "top," "bottom," "front," "back," "leading," "trailing," etc, are used with reference to the orientation of the figures being described. Because components of various embodiments disclosed herein can be positioned in a number of different orientations, the directional terminology is used for illustrative purposes only, and is not intended to be limiting.

As used herein, the term "computer" refers to any type of computing device, including a personal computer, mainframe computer, portable computer, PDA, smart phone, or workstation computer that includes a processing unit, a system memory, and a system bus that couples the processing unit to the various components of the computer. The processing unit can include one or more processors, each of which may be in the form of any one of various commercially available processors. Generally, each processor receives instructions and data from a read-only memory (ROM) and/or a random access memory (RAM). The system memory typically includes ROM that stores a basic input/output system (BIOS) that contains start-up routines for the computer, and RAM for storing computer program instructions and data.

A computer typically also includes input devices for user interaction (e.g., entering commands or data, receiving or viewing results), such as a keyboard, a pointing device (e.g. a computer mouse), microphone, camera, or any other means of input known to be used with a computing device. The computer can also include output devices such as a monitor or display, projector, printer, audio speakers, or any other device known to be controllable by a computing device. In some embodiments, the computer can also include one or more graphics cards, each of which is capable of driving one or more display outputs that are synchronized to an internal or external clock source.

The term "computer program" is used herein to refer to machine-readable instructions, stored on tangible computer-readable storage media, for causing a computing device including a processor and system memory to perform a series of process steps that transform data and/or produce tangible results, such as a display indication or printed indicia.

The term "computer-readable media" as used herein includes any kind of memory or memory device, whether volatile or non-volatile, such as floppy disks, hard disks, CD-ROMs, flash memory, read-only memory, and random access memory, that is suitable to provide non-volatile or persistent storage for data, data structures and machine-executable instructions. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and optical disks, such as CD, CDROM, DVD-ROM, DVD-RAM, and DVD-RW. Any of the above types of computer-readable media or related devices can be associated with or included as part of a computer, and connected to the system bus by respective interfaces. Other computer-readable storage devices (e.g., magnetic tape drives, flash memory devices, and digital video disks) also may be used with the computer.

As used herein, the term "sub-frame" refers to that portion of a display image that is produced for one eye by a single projector. A complete display image produced by multiple sub-frames from one projector or from multiple projectors is referred to as a "composite image." It is to be understood that a single projector can produce a composite image by time multiplexing, to sequentially project individual sub-frames, and that a composite image can also be produced by a sub-group of projectors (i.e. fewer than all of the projectors) in a multiple projector system.

As noted above, 3-D polarized projection uses dual complementary polarizing elements that emit, transmit or reflect images comprised of polarized light, to a polarization preserving screen. The images are then viewed by a viewer wearing special glasses with polarized lenses.

3-D polarized projection systems can use a single projector or multiple projectors. A diagram of one embodiment of a polarization-based 3-D image display system 100 is shown in FIG. 1A. The image display system 100 includes a computer processor 102 that processes image data and transmits the image data to a projector 112, which includes dual complementary polarizing elements and projects a polarized image, indicated generally at 114, to a polarization preserving screen 106. The computer controller 102 can include a dual-head graphics card, having separate channels for the left and right eye images. The image can include any pictorial, graphical, or textural characters, symbols, illustrations, or other representations of information. The display system can also include a calibration camera 122, which is interconnected to the computer processor 102 to provide feedback for calibration, as discussed in more detail below.

Where a single projector 112 is used, the projector is time multiplexed to alternately project right and left eye views to the screen 106. The example shown in FIG. 1A represents a linearly polarized system, though it is to be understood that circularly polarized systems can also be used for 3-D polarization-based projection. With linear polarization, in order to present a stereoscopic motion picture using a single projector, two images are sequentially projected for each frame, onto the screen through differently angled polarizing filters. The polarizing filters can be orthogonally polarized (i.e. being polarized at 90 degree angles relative to each other) or polarized at some other relatively large angle.

The screen is specially constructed to be non-depolarizing, in order to preserve the polarization. The screen can also be configured to preserve brightness, in order to compensate for light loss (since one eye views one frame while the other eye sees nothing).

Figure 1B:
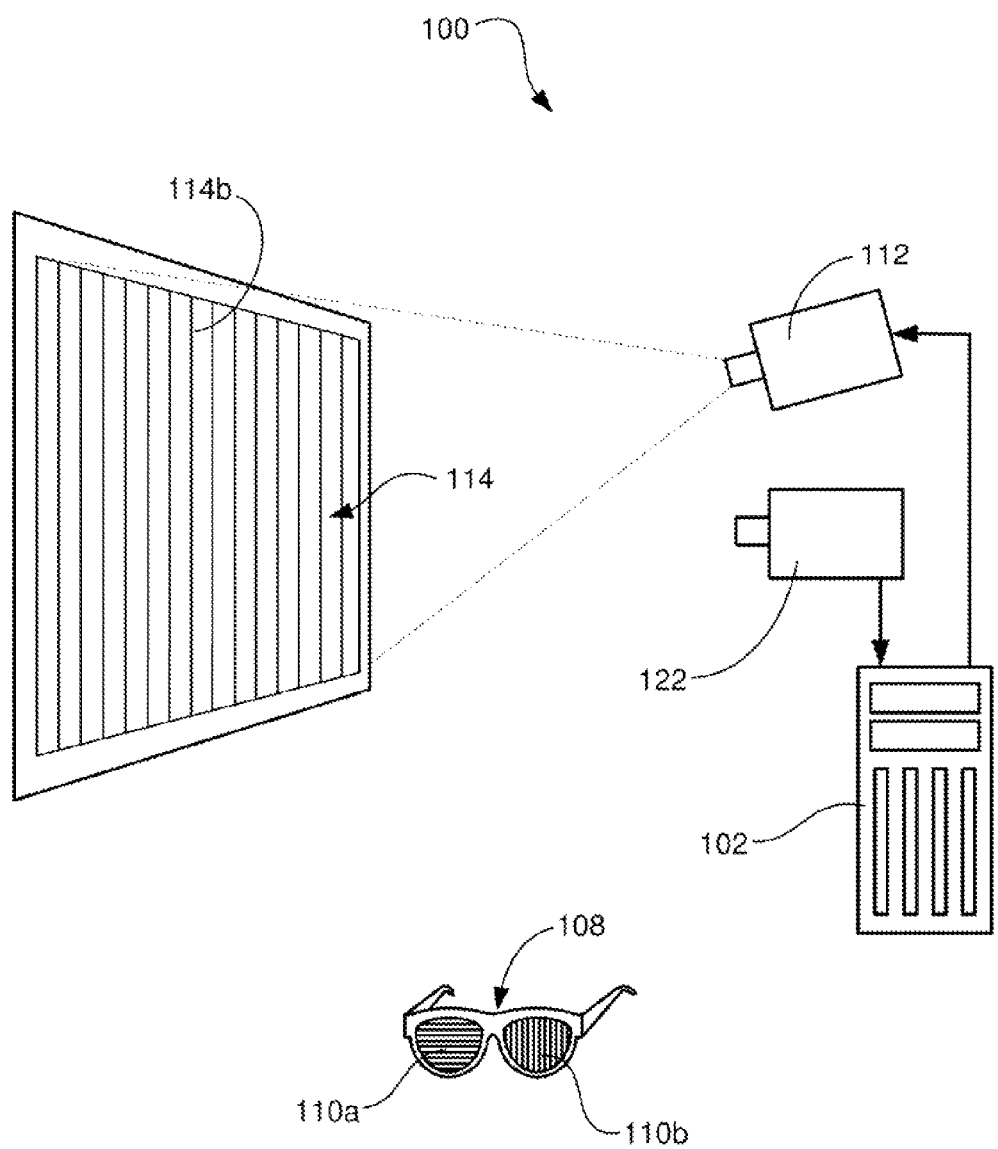
FIG. 1B is a diagram illustrating the single projector polarization-based 3-D display system of FIG. 1A, projecting a vertically polarized sub-frame.

To view the image, the viewer wears low-cost eyeglasses 108 which contain a pair of polarizing filters 110a, 110b. For illustrative purposes, the lenses of the glasses shown in FIGS. 1A and 1B are shown with horizontal and vertical lines, respectively, representing orthogonally polarized lenses. That is, the right lens 110a is horizontally polarized, while the left lens 110b is vertically polarized. It is to be appreciated that FIGS. 1A and 1B are illustrative only. In actual practice the respective angles of polarization can be different than horizontal and vertical. For example, in many polarization-based 3-D systems the polarization angles for each lens are set at 45° and 135°, respectively. Since each filter only passes light which is similarly polarized and blocks other light, each eye only sees that part of the total image that is similarly polarized. That is, the light to each eye is selected to produce distinct images to each eye, creating stereoscopic vision and giving the illusion of depth in the projected image. Advantageously, this approach can enable several people to simultaneously view the stereoscopic images, even without head tracking.

In FIG. 1A, the projection system 100 is shown projecting a horizontally polarized sub-frame 114a. Because of its polarization, this image will pass through the right lens 110a of the polarizing glasses 108, and will be blocked by the left lens 110b of those glasses, since that lens is vertically polarized. In FIG. 1B, however, the projector 112 is projecting a vertically polarized sub-frame 114b, which will be transmitted by the left lens 110b, which has corresponding polarization, but will be blocked by the right lens 110a, which is horizontally polarized. In this way, the viewer's right and left eyes will see different sub-frames, allowing slightly different views to be perceived by each eye, in order to provide the appearance of a 3-D image. These polarized sub-frames can be alternately projected at some multiple of the normal video refresh rate.

For example, where the normal refresh rate for a video projection system is 60 frames per second, the single projector system 100 can be configured to project the individual polarized sub-frames at a rate of 120 sub-frames per second, providing the equivalent of 60 full frames per second to each eye. Those of skill in the art will recognize that other refresh rates and sub-frame rates can also be used.

Figure 2:
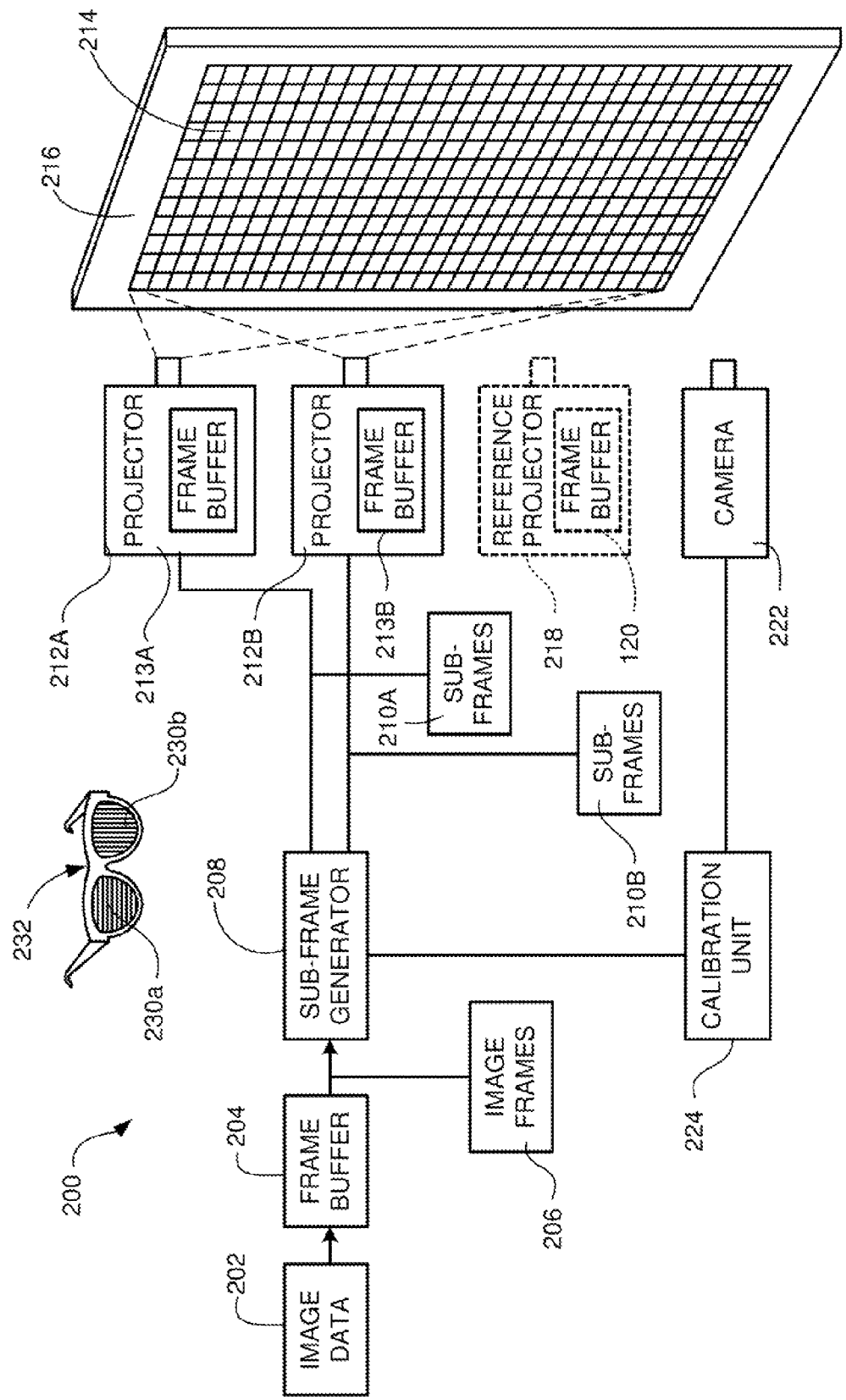
FIG. 2 is a block diagram of one embodiment of a multi-projector 3-D display system.

3-D polarized projection systems can also use multiple projectors. A diagram of a multi-projector 3-D display system is shown in FIG. 2. While this system is shown with two projectors, it is to be understood that a multi-projector system using more than two projectors can also be used. The use of two projectors allows one projector to project the right eye image, and the other projector to project the left eye image in substantially overlapping positions.

The image display system 200 processes image data 202 and generates a corresponding polarized displayed image 214. The image display system includes an image frame buffer 204, a sub-frame generator 208, projectors 212A-212B (collectively referred to as projectors 212), a camera 222, and a calibration unit 224. The image frame buffer 204 receives and buffers image data 202 to create image frames 206. The sub-frame generator 208 processes the image frames 206 to define corresponding image sub-frames 210A-210B (collectively referred to as sub-frames 210) that are differently polarized. In one embodiment, for each image frame 206, the sub-frame generator 208 generates one sub-frame 210A for projector 212A and one sub-frame 210B for projector 212B, these sub-frames corresponding to the right and left eye images, respectively. The sub-frames 210A-210B are received by the projectors 212A-212B, respectively, and stored in the image frame buffers 113A-113B (collectively referred to as image frame buffers 113), respectively. The projectors 212A-212B project polarized sub-frames 210A-210B, respectively, onto the screen 216 to produce the composite displayed image 214 for viewing by a user. The image from projector 212A will be differently polarized than that projected by projector 212B, so that the respective lenses 230a, 230b of the viewer's glasses 232 will pass different images to each eye, giving the illusion of depth in the resulting image.

The image frame buffer 204 includes memory for storing image data 202 for one or more image frames 206. Thus, the image frame buffer 204 constitutes a database of one or more image frames 206. The image frame buffers 113 also include memory for storing sub-frames 210. Examples of image frame buffers 204 and 113 include non-volatile memory (e.g., a hard disk drive or other persistent storage device) and may include volatile memory (e.g., random access memory (RAM)).

The sub-frame generator 208 receives and processes image frames 206 to define a plurality of image sub-frames 210. The sub-frame generator 208 generates sub-frames 210 based on the image data in image frames 206. The projectors 212 receive image sub-frames 210 from the sub-frame generator 208 and can simultaneously project the image sub-frames 210 onto the target surface 216. Where two projectors are used, these sub-frames can be projected in substantially overlapping relation, to simultaneously provide two polarized sub-frames of the total image 214, rather than time multiplexing, as in the embodiment of FIGS. 1A, 1B. However, where more than two projectors are used, selected sub-frames can also be projected to spatially offset positions, to produce a composite image 214 that is tiled or partially overlapped. This can allow the provision of a larger or wider image, or an image with the appearance of a higher resolution display by using overlapping lower-resolution sub-frames 210 from multiple projectors 212.

It will be understood by a person of skill in the art that the functions performed by the sub-frame generator 208 may be implemented in hardware, software, firmware, or any combination thereof. The implementation may be via a microprocessor, programmable logic device, or state machine. Components of the system may reside in software on one or more computer-readable media devices.

Also shown in FIG. 2 is a reference projector 218 with an image frame buffer 220. The reference projector 218 is shown in hidden lines in FIG. 2 because, in one embodiment, the projector 218 is not an actual projector, but rather is a hypothetical high-resolution reference projector that is used in an image formation model for generating optimal sub-frames 210. In one embodiment, the location of one of the actual projectors 212 can be defined to be the location of the reference projector 218. The display system 200 can also include a camera 222 and a calibration unit 224, which can be used to automatically determine geometric mapping between the projector 212 and the reference projector 218.

The image display system 200 can include hardware, software, firmware, or a combination of these. In one embodiment, one or more components of the image display system 200 (e.g. the frame buffer 204, sub-frame generator 208 and calibration unit 224) are included in a computer, computer server, or other microprocessor-based system capable of performing a sequence of logic operations, and having system memory. Such a system is generally referred to herein as a "controller" for the multi-projector system. In addition, processing can be distributed throughout the system with individual portions being implemented in separate system components, such as in a networked or multiple computing unit environment (e.g. clustered computers).

As with the single projector embodiment shown in FIG. 1 and described above, the camera 222 is coupled to the calibration unit 224, and is used to determine compensation parameters for geometry, color, luminance, etc., to allow the multiple projector system to form a seamless image.

As noted above, one significant challenge in 3-D polarized projection is crosstalk between image channels. That is, part of the image intended for one eye leaks or bleeds through to the other eye, thus diminishing image quality. This sort of cross-talk can occur in single- or multiple-projector 3-D systems. Cross-talk in 3-D polarized projection systems generally occurs due to imperfections in the polarization and selection process. For example, cross-talk can originate from the polarizing plate of a given projector, which may not completely polarize the projected light to the desired angle. Additionally, a projection screen that is configured to preserve polarization may not do so perfectly, and the polarizing filters in glasses that are worn by a viewer to select the desired signal may pick up other signals as well. Cross-talk in a polarization-based 3-D projection system can originate from these and other sources.

Most approaches to reducing cross-talk have focused on improved hardware, such as better projection screen materials, better polarizing filters, and better polarizing glasses. Unfortunately, improvements in hardware tend to be expensive and can take significant time to implement.

As disclosed herein, a non-hardware method has been developed for reducing cross-talk in a polarization-based 3-D projection system. This method involves observing light leakage between channels via a camera or recording device during a calibration phase. The leakage is then compensated by digitally correcting the images displayed for the left and right eyes via a computational process. While the embodiments shown herein are polarization-based systems, the method disclosed herein can also apply to other cross-canceling techniques, such as complementary spectral approaches (e.g. using red-green color filters for each eye). Additionally, while the embodiments that are shown and described include two channels for the left and right eye, respectively, the method can also be expanded for more than two channels.

Figure 3:
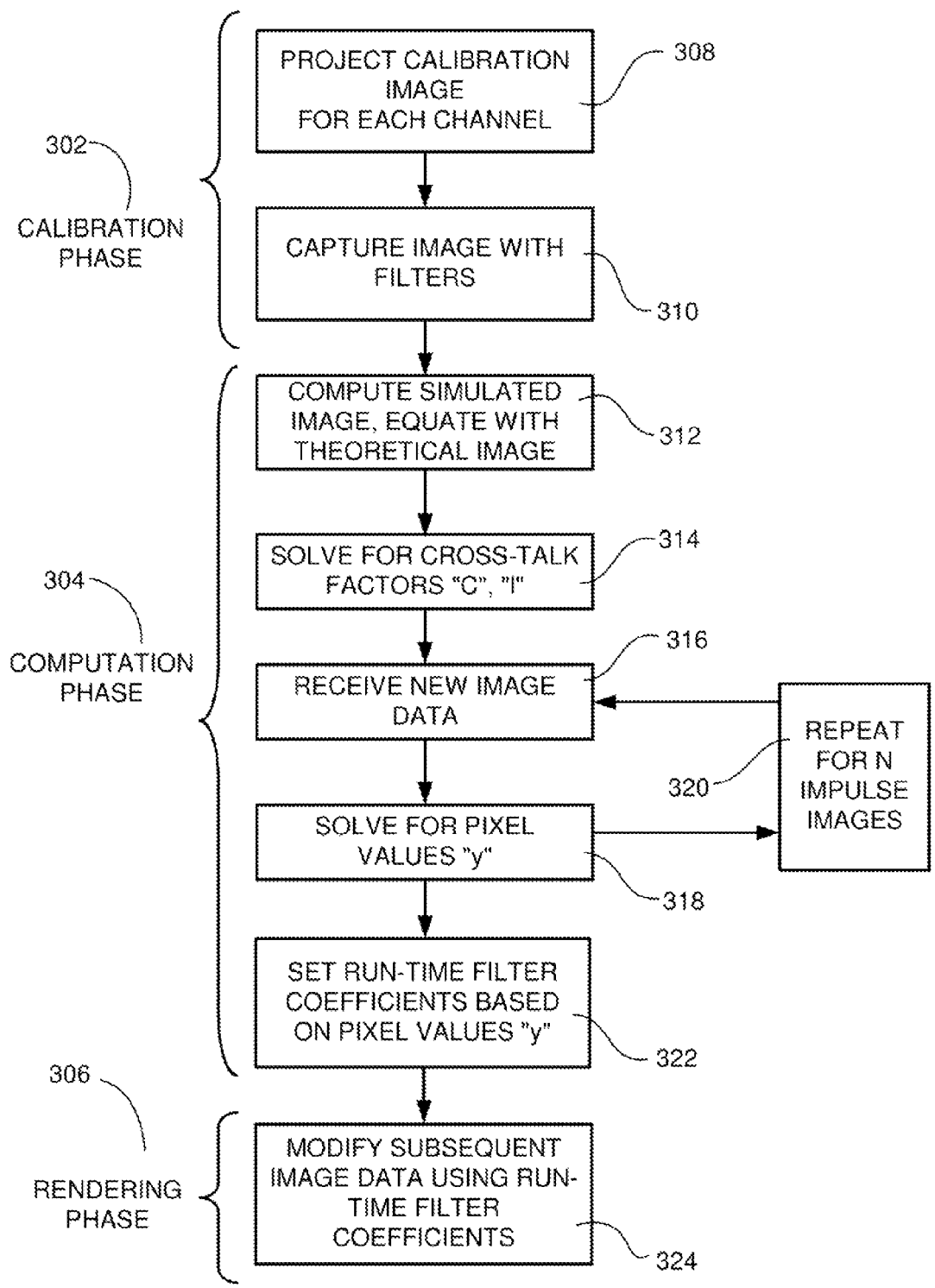
FIG. 3 is a flow chart outlining the steps in one embodiment of a method for reducing cross-talk in a polarization-based 3-D projection system, in accordance with the present disclosure.

A flow chart outlining the steps in one embodiment of this method is provided in FIG. 3. The method has three main phases: a calibration phase 302, a computation phase 304, and a correction/rendering phase 306. The calibration phase provides data that is to be used by a computer (e.g. the computer controller 102 in FIG. 1) in the computation phase. The computation and rendering phases can be performed by the computer controller, which provides a computer system having a processor and system memory. The steps that are performed in each phase can be saved as program steps in stored in memory in the computer. In the calibration phase, the display element(s) (i.e. projector(s)) contributing to the left eye image are used to project a calibration image (e.g. a polarized image) for each channel, respectively (step 308). That is, for a two channel system, the left eye projector first projects an image for the left eye, then projects an image for the right eye. Then the display element(s) contributing to the right eye image are also used to project the image for each eye. Where multiple projectors are involved, this process is repeated for each projector. As suggested in the flow chart of FIG. 3, the image that is projected can be an impulse image that is used as part of a training process for a multi-projector system, such as is outlined in N. Damera-Venkata, N. Chang and J. Dicarlo, "A Unified Paradigm for Scalable Multi-Projector Displays", IEEE Trans. on Visualization and Computer Graphics, November-December 2007 (hereinafter "Damera-Venkata, Chang and Dicarlo").

As will be appreciated by those of skill in the art, a variety of different calibration patterns can be used for geometric and color calibration in single or multi-projector systems. Where calibration for cross-talk is concerned, however, the calibration patterns can be a flat field of each color primary. That is, for a red-green-blue (RGB) projection system, each calibration screen can be a solid image of a single primary color of (presumably) uniform intensity. Each calibration image is projected sequentially with polarizing filters on the projector(s), unlike typical geometric or color calibration for a camera-projector system.

As each image is displayed, a camera (i.e. the calibration camera 222 in FIG. 2) observes the projected image with dual-polarizing filters, in order to mimic the effect of polarized glasses (step 310). This may be done by first introducing one polarizing filter over the camera and taking an image, and then repeating the process with the other polarizing filter. It is assumed in this step that the filters are positioned in a similar orientation (with respect to the screen) as a viewer wearing polarized glasses would be. This step captures crosstalk because any leakage from one image to the other will show up. For example, assuming an RGB projection system, when a red calibration image is projected for the left eye, the right eye should theoretically see nothing. However, to the extent that there is leakage, the right eye image will capture some level of red light in some regions of the view and may also capture other light, such as green and blue. This reflects the fact that in addition to spatial leakage, the system can also exhibit spectral leakage. The converse is also true: when the red calibration image is projected for the right eye, any leakage will show up as some level of red and possibly also blue and green light captured by the left eye. As noted above, this process of taking these images is repeated for each combination of right/left eye image and right/left eye reception for each projector.

Those of skill in the art will recognize that the calibration approach described above can be performed in conjunction with geometric, luminance and color calibration, especially where a multiple camera system is used. For example, following geometric calibration of a camera group, in addition to projecting calibration patterns for detecting cross-talk, the sequential projection of red, green and blue color primaries can be used to allow color calibration as well. However, in a multi-projector system, the cross-talk calibration process disclosed herein is normally performed after geometric calibration is completed, so that images from each projector will be spatially oriented in the desired way. Other calibration operations can also be performed. It will also be apparent that where the 3-D display system is not a polarization-based system, the step of capturing the projected calibration images (step 310) will involve the calibration camera viewing the calibration image with some other appropriate filter (e.g. color filters), rather than polarizing filters.

Based upon the captured images from step 310, the first step in the computation phase 304 is to construct a simulated image or model of what the eye would see if a given image were projected from the projector(s) (step 312). This model is a numerical model of the actual image that is being projected. In other words, the computer system analyzes the image that is captured by the calibration camera, and constructs a numerical model of that image. The numerical model represents a data stream that corresponds to the image that was actually captured. If y is used to represent the color value of a given pixel at coordinates (m,n), and l represents the luminance value of that pixel, then the construction of the simulated image can be represented by the following expressions:

$$C_l y_l(m,n) l_l(m,n) + C_{rl} y_r(m,n) l_{rl}(m,n) = x_l(m,n) \quad [1]$$

$$C_r y_r(m,n) l_r(m,n) + C_{lr} y_l(m,n) l_{lr}(m,n) = x_r(m,n) \quad [2]$$

In these expressions the l and r subscripts denote the left and right images, respectively. Viewing the first term of equation [1], $C_l$ represents an identity matrix for the left eye, $y_l$ represents the pixel value (i.e. color) that is intended to be projected for the left eye at coordinates (m,n) and $l_l$ represents the luminance of that pixel. A similar first term is provided in equation [2], except that it applies to the right eye. The second term of each equation introduces the effect of cross-talk. The terms $C_{rl}$ and $C_{lr}$ represent spectral cross-talk between the two channels. The terms $l_{rl}$ and $l_{lr}$ represent spatial cross-talk between the two channels. These expressions on the left side of equations [1] and [2] represent the simulated image for each eye, and are denoted as $x_l$ and $x_r$.

The "simulated" image represented by the terms on the left side of equations [1] and [2] is then compared with a desired theoretical cross-talk-free image (step 312). Specifically, mathematical expressions representing the desired image without cross-talk are substituted into the right side of equations [1] and [2], in place of $x_l$ and $x_r$. The desired cross-talk-free image is a theoretical image that is determined by the computer controller, and represents a numerical model of the image that the camera should capture if there were no cross-talk. In other words, the theoretical image is an image data stream that has been transformed to that which would produce a desired camera view of an ideal projection system, with no cross-talk. Where multiple projectors are used, this image represents a consistent feasible ideal image from each projector. For example, since different projectors in a given multi-projector system can each have a different color gamut, the theoretical image will take that into account, and represent each color as a component of the intersection gamut of all projectors, so that the theoretical image is feasible for all projectors. For purposes of this disclosure, it is presumed that the controller system is already programmed to be "aware" of these various aspects of commonality. Other aspects of commonality between projectors can also be taken into consideration when calculating the theoretical image.

The next step is to solve for the cross-talk parameters or factors C and l in equations [1] and [2]. This step involves setting the expressions representing the simulated image and theoretical image equal to each other, and then solving for the variables C and l. This is step 314. The values for C and l can be directly obtained using equations [1] and [2] since the pixel values y are known for the calibration image. The values for C and l represent characteristics of a given projector and are not image dependent, while the values for y are image dependent. However, with a calibration image comprising a flat field of a single color, the y values will be known, allowing equations [1] and [2] to be directly solved for C and l for a given projector. These values of C and l can be stored in computer memory.

With the cross-talk factors (the values of C and l) determined, the next step is to receive new image data (step 316) and solve for the pixel values y (step 318) in equations [1] and [2]. The new image data can be data representing an impulse or training image, for example, or data representing some other image. A mathematical expression representing the new image data is substituted into equations [1] and [2] in a manner similar to the way in which the theoretical image was substituted, as described above, and the equations are then solved for the pixel values y.

While the exemplary embodiment described above with respect to equations [1] and [2] relates to a two channel (left and right) system, the method disclosed herein can also be extended to support more than two channels. That is, cross-talk between more than two projection channels can be compensated in a similar manner. Where more than two channels are involved, the relevant equations can be extended. For example, where three channels are involved, a group of three equations, similar to equations [1] and [2] above, would be used, but each of the three equations would include additional terms to account for the additional cross-talk pathways.

In the embodiment outlined in FIG. 3, this process of receiving an impulse image for each projector, then computing the pixel values for correcting that image can be repeated multiple times for multiple impulse images in a training process, as indicated by repeat block 320. This type of training process is known to those of skill in the art, and is presented in Damera-Venkata, Chang and Dicarlo, and in N. Damera-Venkata and N. L. Chang, "Realizing Super-resolution With Superimposed Projection", Proc. IEEE International Workshop on Projector-Camera Systems (ProCams), Minneapolis, Minn., June 2007 (hereinafter "Damera-Venkata and Chang").

By performing this training process on a series of impulse images, several sets of corrected y values can be obtained. These corrected pixel values can be collectively used to produce a set of linear run-time filter coefficients (step 322) that can be used for any subsequent image in the rendering phase 306. That is, once the impulse images have been corrected in step 318, the system can determine a series of linear coefficients (step 322) by which the data stream for all subsequent images can be transformed in real time prior to projection (step 324). These coefficients allow the rapid correction of subsequent images to reduce cross-talk so that each subsequent image frame is closer to a theoretical cross-talk free image than otherwise.

The process described herein is image dependent. That is, the correction of a given image frame (whether a calibration pattern or other image) will be unique. Thus, the computational solution obtained in step 318 will be different for each image used in step 316. However, by repeating the training process multiple times, as indicated in step 320, the error terms of the various mathematical iterations can be encapsulated in a filter to obtain the run-time filter coefficients, so that the output for any input can be computed using the same set of filters, allowing faster real-time rendering. Consequently, the training method outlined above will provide run-time filter coefficients that will substantially reduce cross-talk for subsequent images, though a small quantity of cross-talk may still occur in some images. While this approach does not necessarily produce a perfect calibration for each image frame, it provides an approximate solution for each image frame, significantly reducing cross-talk in a moving video image.

Alternatively, in another embodiment, the system can perform continuous cross-talk corrections on every image frame of a video stream in real time. A flow chart outlining the steps in this embodiment is provided in FIG. 4. Like the process outlined in FIG. 3, this process includes a calibration phase 402, a computation phase 404, and a rendering phase 406. As in the prior embodiment, in the calibration phase, a polarized calibration image is first projected by each projector for each eye (step 408). In step 410, as in step 310, the image is viewed by a calibration camera with polarizing filters, first for one eye, then the other.

The processes of computing a simulated image (step 412), equating the simulated image to a theoretical image (step 414) and solving for the cross-talk factors "C" and "l" (step 416) is also the same as the comparable steps in the embodiment of FIG. 3. However, rather than using impulse images to produce run-time filter coefficients, the cross-talk factors of "C" and "l" that are determined in step 416 are applied directly to new image data that is received in step 418. Specifically, data representing a new image frame is received in step 418. The new image data is equated with the expressions of equations [1] and [2] with the values of "C" and "l" therein. This allows the system to solve for the pixel values y for that specific image (step 420).

Rather than use these values to create run-time filter coefficients, the image data received in step 418 is directly corrected, and that specific image is projected with the corrected pixel values (step 422). It is to be appreciated that equations [1] and [2] are linear. However, the value of y is constrained to be between zero and one, since a pixel cannot have a negative value or a value greater than one. With this constraint, these equations become non-linear, but can be solved using an iterative computational process such as a gradient descent process. Viewing equation [1] above, the computer system is programmed to make an initial estimate or guess of the $y_l$ and $y_r$ values, then find an error term, adjust the $y_l$ and $y_r$ values, and repeat the process until the simulated image and the new image data set are equal, with the error term applied. This process ultimately provides a cross-talk correction for the new image data. The gradient descent process is non-linear. Consequently, the gradient descent computation ultimately yields a single solution for the particular image, which will be corrected for cross-talk. This type of process for iteratively solving for multiple pixel values is outlined in the Damera-Venkata, Chang and Dicarlo, and Damera-Venkata and Chang references cited above. It is to be understood that other methods of solving these linear equations, besides the gradient descent method, can also be used.

Figure 4:
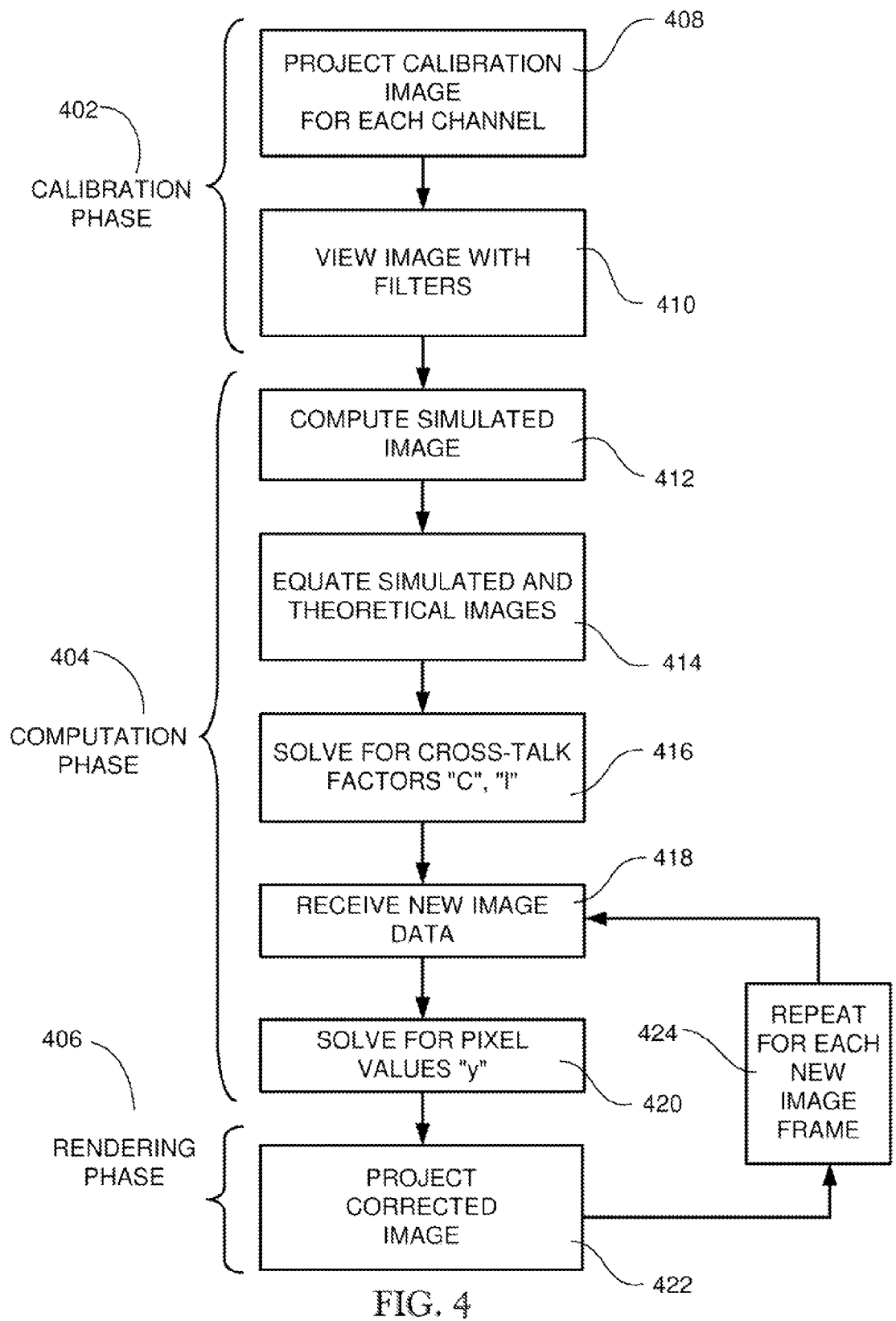
FIG. 4 is a flow chart outlining the steps in another embodiment of a method for reducing cross-talk in a polarization-based 3-D projection system, in accordance with the present disclosure.

The corrected image is projected (step 422), and this process can then repeat (step 424) for the next image frame, returning to step 418. In this way, each frame of a video stream can receive a unique calibration. Performing these calibration calculations in real time for each image frame of a video stream provides a higher quality image, though it can slow down the speed of the projection system. Stated differently, the process outlined in FIG. 4 provides higher quality images than the process outlined in FIG. 3, but requires more computer processing. Thus, for still images or applications that do not require full motion video, the process of FIG. 4 can be used to provide higher quality images than the method outlined in FIG. 3. Nevertheless, with sufficient microprocessor power, the process outlined in FIG. 4 can also be made to receive and correct video images at a speed that is suitable for moving video.

The method disclosed herein presents a computational solution to 3-D cross-talk, rather than a hardware approach. Computationally compensating for crosstalk allows low cost components to be used, and can improve quality even with high quality content. With this compensation the images become sharper because the blur due to crosstalk is substantially reduced. As noted above, it is also to be appreciated that the method disclosed herein can also apply to other cross-canceling techniques, such as complementary spectral approaches, and can also be extended to support more than two channels by extending the relevant equations.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. A method for compensating for cross-talk in a 3-D projector-camera system having a controller including a processor and system memory and at least two channels, comprising the steps of:
   calibrating the projector-camera system by sequentially projecting, with a projector, and capturing, with a camera, a calibration image for each channel, to capture cross-talk between the channels wherein the calibration image comprises a flat field of a single color;
   mathematically constructing, via the controller, a simulated image, including cross-talk, based upon the captured image for each channel;
   comparing the simulated image, via the controller, with a theoretical cross-talk free image, and solving for spatial and spectral cross-talk factors, wherein the theoretical cross-talk free image is the calibration image that the camera captures if there is no cross-talk;
   computing, via the controller, the cross-talk factors applicable to the projector-camera system based upon the captured images;
   correcting new image data for cross-talk based upon the computed cross-talk factors wherein the new image data comprises multiple impulse images;
   setting run-time filter coefficients based upon the correction of the multiple impulse images;
   correcting subsequent image frames using the run-time filter coefficients; and
   projecting the corrected subsequent image frames.

2. The method in accordance with claim 1, wherein the step of correcting the new image data comprises solving for pixel values using a gradient descent process.

3. The method in accordance with claim 1, further comprising the step of projecting the new image data after correction.

4. The method in accordance with claim 1, wherein the projector-camera system comprises multiple projectors coupled to the controller and oriented toward a common projection location.

5. A method, performed by a computer including a processor and system memory, for compensating for cross-talk in a polarization-based 3-D projection system, comprising the steps of:
- sequentially transmitting by a projector to a projection location a polarized calibration image on each of two channels of a polarization-based projection system;
- capturing the projected calibration images via a calibration camera oriented toward the projection location wherein the calibration image comprises a flat field of a single color;
- mathematically constructing, via the controller, a simulated image, including cross-talk, based upon the captured image for each channel;
- comparing the simulated image, via the controller, with a theoretical cross-talk free image, and solving for spatial and spectral cross-talk factors, wherein the theoretical cross-talk free image is the projected calibration image that the camera captures if there is no cross-talk;
- computing, via the controller, the cross-talk factors applicable to the projection system based upon the captured images;
- correcting new image data for cross-talk based upon the computed cross-talk factors wherein the new image data comprises multiple impulse images;
- setting run-time filter coefficients based upon the correction of the multiple impulse images;
- correcting subsequent image frames using the run-time filter coefficients; and
- projecting the corrected subsequent image frames.

6. The method in accordance with claim 5, further comprising the step of providing a data stream representing the corrected new image data to a projection system for projection.

7. A non-transitory computer program product comprising machine-readable instructions, stored on computer-readable storage media, for causing a computing device, including a processor and system memory, coupled to a 3-D projector-camera system having at least two channels, to perform the steps of:
- calibrating the projector-camera system by sequentially projecting with a projector and capturing, with a camera, polarized images for each channel, to detect cross-talk between the channels wherein each polarized image among the polarized images comprises a flat field of a single color;
- mathematically constructing, via the controller, a simulated image, including cross-talk, based upon the polarized image for each channel;
- comparing the simulated image, via the controller, with a theoretical cross-talk free image, and solving for spatial and spectral cross-talk factors, wherein the theoretical cross-talk free image is the polarized image that the camera captures if there is no cross-talk;
- computing the cross-talk factors applicable to the projector-camera system based upon the captured images;
- correcting new image data for cross-talk based upon the computed cross-talk factors wherein the subsequent new image data comprises impulse images;
- setting run-time filter coefficients based upon the correction of the multiple impulse images;
- correcting the subsequent image frames using the run-time filter coefficients; and
- projecting the corrected subsequent image frames.

8. The non-transitory computer program product in accordance with claim 7, wherein the step of computing the cross-talk factors comprises mathematically comparing a respective theoretical cross-talk free image with a simulated image mathematically representing the captured image, and solving for the cross-talk factors.

9. The non-transitory computer program in accordance with claim 8, further comprising the steps of:
- mathematically equating multiple simulated impulse images with corresponding theoretical cross-talk free images;
- solving the equations for corrected pixel values; and
- computing run-time filter coefficients for use in correcting and rendering the subsequent image based upon the corrected pixel values.

10. The non-transitory computer program in accordance with claim 8, further comprising the steps of
- mathematically equating a single simulated image representing the subsequent image with a corresponding theoretical cross-talk free image;
- solving the equation for corrected pixel values; and
- rendering the subsequent image based upon the corrected pixel values.

* * * * *